(12) United States Patent
Mitsuda

(10) Patent No.: US 7,551,529 B2
(45) Date of Patent: Jun. 23, 2009

(54) OPTICAL DISC APPARATUS

(75) Inventor: Hiroshi Mitsuda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 518 days.

(21) Appl. No.: 11/503,919

(22) Filed: Aug. 15, 2006

(65) Prior Publication Data

US 2007/0041289 A1 Feb. 22, 2007

(30) Foreign Application Priority Data

Aug. 22, 2005 (JP) ............... 2005-239585

(51) Int. Cl.
*G11B 7/00* (2006.01)
(52) U.S. Cl. ............... 369/44.35; 369/44.32; 369/53.28
(58) Field of Classification Search ........................ None
See application file for complete search history.

(56) References Cited

U.S. PATENT DOCUMENTS 5,255,252 A * 10/1993 Katayama ................ 369/44.36

FOREIGN PATENT DOCUMENTS

| JP | 63-173233 | 7/1988 |
| JP | 04-113523 | 4/1992 |
| JP | 8-335323 | 12/1996 |
| JP | 9-320178 | 12/1997 |
| JP | A-2002-032924 | 1/2002 |
| JP | 2003-123294 | 4/2003 |
| JP | 2004-87054 | 3/2004 |

* cited by examiner

*Primary Examiner*—Paul Huber
(74) *Attorney, Agent, or Firm*—Morgan Lewis & Bockius LLP

(57) ABSTRACT

In an optical disc apparatus, the amplitude level of a focus error signal for performing focus search is measured, and in order to bring the measured amplitude level of the focus error signal to a target value, gains of focus servo drive amplifiers which amplify respective detection signals from four respective divided detection regions of an optical detector are set as initial values. As a result, the amplitude level of the focus error signal is adjusted at the target value. Next, the amplitude levels of the detection signals from the respective detection regions are measured, and the gains of the respective focus servo drive amplifiers are adjusted individually so that crosstalk can be cancelled based on the measured amplitude levels of the detection signals.

7 Claims, 7 Drawing Sheets

OPTICAL DISC APPARATUS

This application is based on Japanese Patent Application No. 2005-239585 filed on Aug. 22, 2005, the contents of which are hereby incorporated by reference.

BACKGROUND OF THE INVENTION

1. Field of the Invention

The present invention relates to an optical disc apparatus which performs information reproduction from an optical disc or performs information recording/reproduction on/from the optical disc, and more specifically to an optical disc apparatus having a function of reducing a crosstalk component of a trucking error signal appearing in a focus error signal.

2. Description of the Prior Art

Conventionally, the optical disc apparatus is provided with: an optical pickup which emits a laser beam for performing information reproduction from the optical disc or performing information recording/reproduction on/from the optical disc and also which receives a reflecting beam from the optical disc; and a servo control part which performs tracking servo and focus servo on the optical disc of this optical pickup. In such an optical disc apparatus, an RF amplifier which amplifies an RF signal read from the optical disc by the optical pickup is provided with a focus error signal generation circuit which generates a focus error signal.

FIG. 8 shows a block diagram of a focus error signal generation circuit included in the RF amplifier in the conventional optical disc apparatus. This focus error signal generation circuit 137a is included inside an IC (integrated circuit) composing the RF amplifier. The focus error signal generation circuit 137a is provided with: an input terminal VIN5 for inputting a detection signal a as an output signal of a detection region A of an optical detector 2b included in the optical pickup; an input terminal VIN6 for inputting a detection signal b as an output signal of a detection region B, an input terminal VIN7 for inputting a detection signal c as an output signal of a detection region C, and an input terminal VIN8 for inputting a detection signal d as an output signal of a detection region D.

The detection signal a inputted to the VIN5 is amplified by two-stage focus servo drive amplifiers a1 and a2, and then inputted to an adder 31. The detection signal b inputted to the VIN6 is amplified by two-stage focus servo drive amplifiers b1 and b2, and then inputted to an adder 32. The detection signal c inputted to the VIN7 is amplified by two-stage focus servo drive amplifiers c1 and c2, and then inputted to the adder 31. The detection signal d inputted to the VIN8 is amplified by two-stage focus servo drive amplifiers d1 and d2, and then inputted to the adder 32. The focus servo drive amplifiers a1 to d2 are adjusted at the same gain by a gain change processing circuit G2 controlled by a servo control part 104a.

The adder 31 adds together an output signal of the focus servo drive amplifier a2 and an output signal of the focus servo drive amplifier c2. The adder 32 adds together an output signal of the focus servo drive amplifier b2 and an output signal of the focus servo drive amplifier d2. The subtracter 33 subtracts an output signal of the adder 32 from an output signal of the adder 31, and outputs this subtraction result as a focus error signal FE.

Hereinafter, a description will be given concerning the process performed, in the conventional optical disc apparatus having the focus error signal generation circuit 137a with the configuration as described above, from when a CD which produces more crosstalk than a DVD is inserted to when focus servo is turned on. The more crosstalk produced by the CD than by the DVD in the event of positional balance shift of the detection regions A, B, C, and D is possibly attributable to difference in the laser power and wavelength, or difference in the disc structure, or the like.

After inserted in the optical disc apparatus, the CD rotates, and recording information is read from the CD by the optical pickup. From the optical detector 2b of the optical pickup, an RF signal is outputted which is then amplified by the RF amplifier (not shown) and inputted to the servo control part 104a.

After the CD is inserted in the optical disc apparatus and preparation for reading has been completed, during a processing period when the optical pickup irradiates the CD with a laser beam specific to a CD and then the optical disc determines whether or not the optical disc is a CD, the following processing is performed. Specifically, the servo control part 104a, before performing focus servo control, first measures the amplitude level of a focus error signal for performing focus search. In order to bring the measured amplitude level of the focus error signal a target value, the servo control part 104a sets the gains of the focus servo drive amplifiers d1 and d2 as initial values and adjusts the amplitude level of the focus error signal. If the gains of the focus servo drive amplifiers a1 to d1 at the first stage are previously fixed at the same value, the initial values of the gains of the focus servo drive amplifier a2 to d2 at the second stage are set.

Next, if it is determined that the inserted optical disc is a CD, during the processing period when the optical pickup irradiates the CD with a laser beam specific to a CD to perform focus search, the servo control part 104a measures the amplitude level of the focus error signal. Subsequently, based on the measured amplitude level of the focus error signal, the servo control part 104a performs S-curve balance adjustment of the focus error signal. Then, the servo control part 104a turns on focus servo control, thereby permitting the focus servo control to be performed on the CD of the optical pickup.

The optical pickup is provided with the optical detector 2b which receives a reflecting beam from the optical disc and which has four detection regions (for example, detection regions of four light receiving elements such as photodiodes or the like) A, B, C, and D arranged in a 2 by 2 matrix. However, an error (positional balance shift) in the fitting position of these light receiving elements causes a phenomenon that a component of a trucking error signal affects a focus error signal upon track jumping across a land and a groove on the optical disc, that is, T-F crosstalk (hereinafter simply referred to as crosstalk), thereby causing defocusing of a laser beam emitted from the optical pickup or resulting in difficulty in turning on focus servo.

In the focus error signal generation circuit 137a in this conventional optical disc apparatus, the gains of the focus servo drive amplifiers a1 to d2 for the detection signals a, b, c, and d from the detection regions A, B, C, and D are not individually adjusted. Thus, in the event of positional balance shift of the detection regions A, B, C, and D, this positional balance shift is directly amplified by the focus servo drive amplifiers d1 and d2, thus resulting in a larger amplitude level difference among the detection signals. This leads to failure to reduce the crosstalk, thus causing a seek failure on the optical disc of the optical pickup or a vibration phenomenon in the optical pickup, which in turn poses a problem of defocusing during seek.

JP-A-2002-32924 discloses an offset detector and an offset corrector of an optical head. In these devices, the levels of detected outputs a to d of four divided light receiving regions are each detected by a level detection circuit. Next, based on the levels of the detected outputs a to d, a gain adjustment circuit performs level adjustments of a first addition output of the detected outputs a and c, and a second addition output of the detected outputs b and d, and performs control so that the focus error signal, i.e., a difference between the first and second addition outputs becomes "0". This conventional technology does not adjust the detected outputs a to d individually, thus resulting in failure to reduce the crosstalk that is influenced by the positional balance shift of the four divided detection regions of the optical pickup. This consequently causes a seek failure on the optical disc of the optical pickup or a vibration phenomenon in the optical pickup, which in turn poses a problem of defocusing during seek.

SUMMARY OF THE INVENTION

In view of the problem described above, the present invention has been made, and it is an object of the invention to provide an optical disc apparatus having a function of reducing the crosstalk caused by positional balance shift of four divided detection regions of an optical detector in an optical pickup.

To achieve the object described above, according to one aspect of the invention, an optical disc apparatus for performing information recording or reproduction on or from an optical disc, includes: an optical pickup having an optical detector which receives a reflecting beam, by four divided detection regions, from the optical disc which is irradiated with a laser beam; a focus error signal generation circuit which generates a focus error signal based on detection signals from the four divided detection regions; and a servo control part which performs tracking servo and focus servo of the optical pickup on the optical disc. The focus error signal generation circuit comprises focus servo drive amplifiers that amplify the detection signals individually. The servo control part measures an amplitude level of the focus error signal for performing focus search, sets gains of the focus servo drive amplifiers as initial values based on a result of the measurement so as to bring the amplitude level of the focus error signal to a target value, and measures amplitude levels of the respective detection signals and controls the gains of the focus servo drive amplifies individually so that crosstalk can be cancelled based on the measured amplitude levels of the respective detection signals.

Moreover, in order to achieve the object described above, according to another aspect of the invention, a control method for an optical disc apparatus which performs information recording or reproduction on or from an optical disc and which includes: an optical pickup having an optical detector which receives a reflecting beam, by four divided detection regions, from the optical disc which is irradiated with a laser beam; a focus error signal generation circuit which generates a focus error signal based on detection signals from the four divided detection regions; and a servo control part which performs tracking servo and focus servo of the optical pickup on the optical disc, including the steps of: measuring an amplitude level of the focus error signal for performing focus search; adjusting the amplitude level of the focus error signal by setting initial values of gains for amplifying the respective detection signals from the respective four divided detection regions of the optical detector so as to bring the measured amplitude level of the focus error signal to a target value; measuring the amplitude levels of the detection signals from the respective detection regions; and amplifying the detection signals by the respective individual gains so that crosstalk can be cancelled based on the measured amplitude levels.

According to the configuration and the control method described above, the gains for amplifying the detection signals from the respective detection regions are individually adjusted; thus, even in the event of positional balance shift of the detection regions, the levels of the amplified detection signals become equal to each other, thereby reducing the crosstalk. As a result, a seek failure on the optical disc of the optical pickup or a vibration phenomenon in the optical pickup is suppressed, thus preventing defocusing during seek.

DETAILED DESCRIPTION OF PREFERRED EMBODIMENTS

Figure 1:
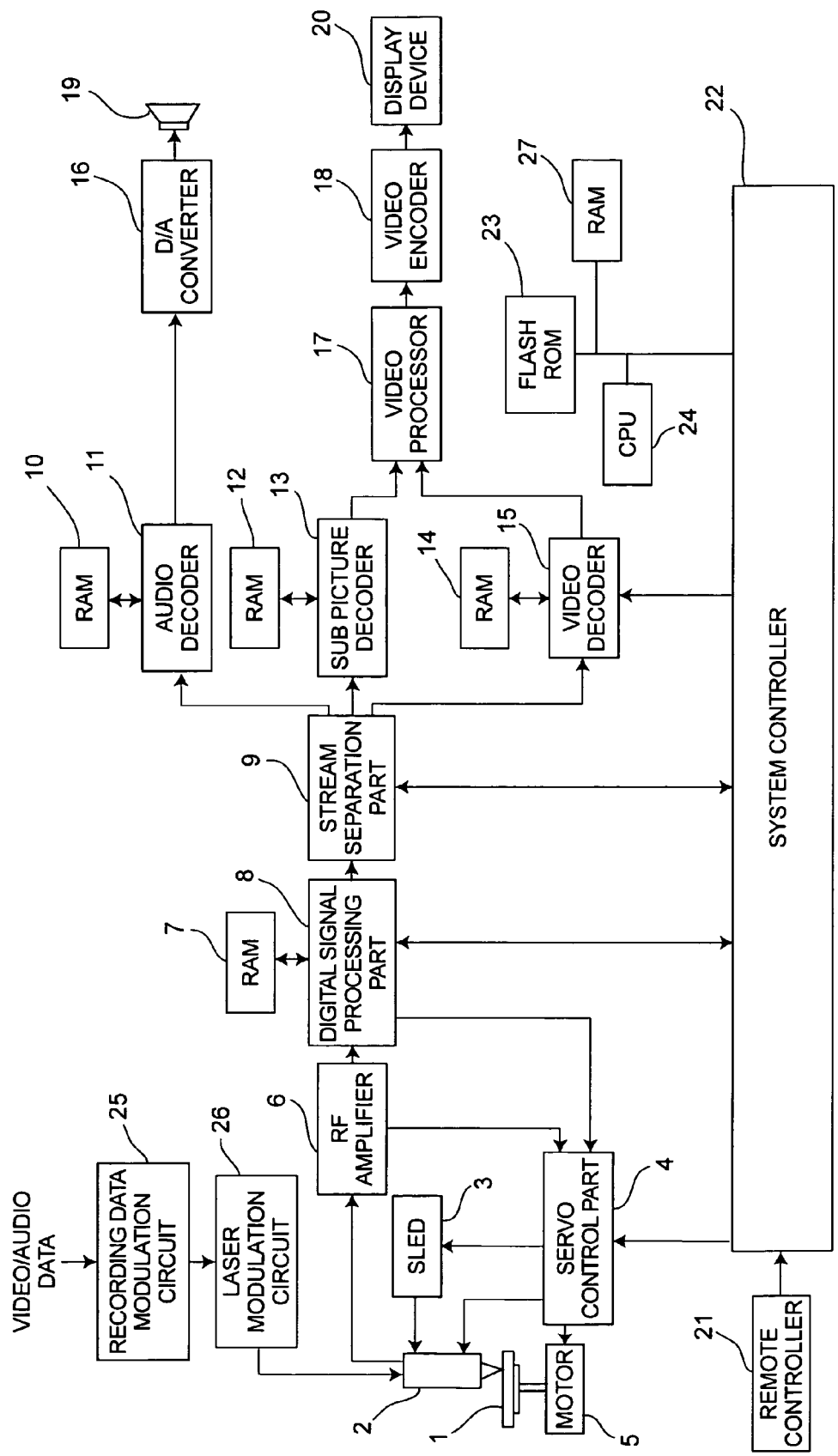
FIG. 1 is a block diagram showing the configuration of an optical disc apparatus according to one embodiment of the present invention.

Hereinafter, the embodiment of the present invention will be described with reference to the accompanying drawings. FIG. 1 is a block diagram showing the configuration of an optical disc apparatus according to one embodiment of the invention. Here, the configuration of the optical disc apparatus such as a DVD recorder or the like will be described, and it is needless to say that processing of changing the focus gain is similarly applicable to an optical disc apparatus such as a DVD player or the like.

This optical disc apparatus is provided with: a spindle motor 5 which rotates an optical disc 1; an optical pickup 2 which emits a laser beam for performing information recording/reproduction on/from the optical disc 1 and also which receives a reflecting beam from the optical disc 1; a sled 3 for moving this optical pickup 2 in the radial direction of the optical disc 1; and a servo control part 4 which, in accordance with instructions from a system controller 22, drives the spindle motor 5 and the sled 3 and operates an objective lens (not shown) built in the optical pickup 2 to thereby perform control of moving the focal position of a laser beam perpendicularly and horizontally with respect to the recording surface of the optical disc 1.

This optical disc apparatus is also provided with: an RF amplifier 6 which amplifies an RF signal as a signal read from the optical pickup 2 upon reproduction from the optical disc 1; a digital signal processing part 8 which, after converting the RF signal outputted from this RF amplifier 6 into digital data, performs signal demodulation processing and ECC error correction processing in accordance with the data format of the optical disc 1 to thereby store the generated data into a RAM 7; and a stream separation part 9 which separates audio data, subpicture data, and video data from among a data stream outputted from the digital signal processing part 8 in accordance with instructions from the system controller 22.

This optical disc apparatus is also provided with: an audio decoder 11 which performs predetermined decoding processing upon receiving the audio data outputted from the stream separation part 9; a RAM 10 which temporarily stores data for performing the decoding processing in the audio decoder 11; a subpicture decoder 13 which performs predetermined decoding processing upon receiving the subpicture data outputted from the stream separation part 9; a RAM 12 which temporarily stores data for performing the decoding processing in the subpicture decoder 13; a video decoder 15 which performs predetermined decoding processing upon receiving the video data outputted from the stream separation part 9; and a RAM 14 which temporarily stores data for performing the decoding processing in the video the decoder 15.

This optical disc apparatus is also provided with: a video processor 17 which, in accordance with instructions from the system controller 22, synthesizes data outputted from the video decoder 15 and data outputted from the subpicture decoder 13; a video encoder 18 which converts the synthesized data outputted from the video processor 17 into a display video signal and then has the image displayed on a display device 20; and a D/A converter 16 which converts the data outputted from the audio decoder 11 into an analog audio signal and supplies it to, for example, a speaker 19.

This optical apparatus is also provided with: a remote controller 21 having various operation keys for providing instructions to the system controller 22 by an infrared signal, including a reproduction key for instructing reproduction, a stop key for instructing stopping reproduction; a recording key for instructing recording, a power key, and the like; and the system controller 22 that controls the entire apparatus.

This optical disc apparatus is also provided with: a flash ROM 23 which stores programs and data for controlling each component of the apparatus and controlling the entire apparatus; a CPU 24 which performs operations in accordance with the data and programs stored in this flash ROM 23 and controls the system controller 22; and a RAM 27 which temporarily stores data required for processing by the CPU 24.

This optical disc apparatus is also provided with: a recording data modulation circuit 25 which modulates video audio data transmitted from a television receiver, a personal computer, or the like, all not shown, so as to record it to the optical disc 1; and a laser modulation circuit 26 which modulates a laser beam emitted from the optical pickup 2 based on the data modulated by this recording data modulation circuit 25.

Figure 2:
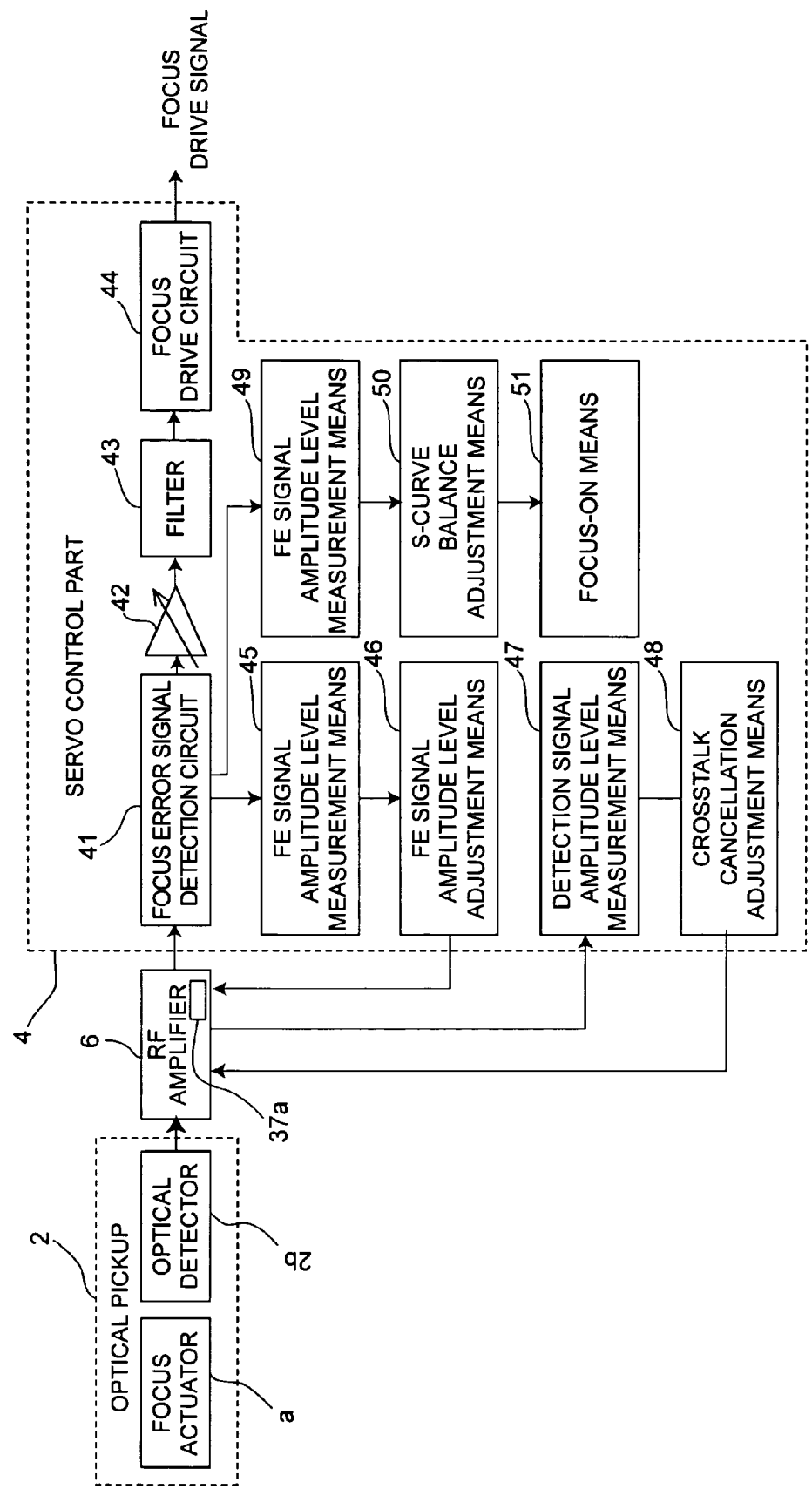
FIG. 2 is a block diagram for explaining the configuration of a servo control part in FIG. 1.

FIG. 2 is a block diagram for explaining the configuration of the servo control part 4 of FIG. 1. In FIG. 2, the servo control part 4 is provided with: a focus error signal detection circuit 41 which detects a focus error signal included in an RF signal from the RF amplifier 6; an amplifier 42 which receives and amplifies the focus error signal; a filter 43 which receives the focus error signal from the amplifier 42 and eliminates an unnecessary frequency component therefrom; and a focus drive circuit 44 which, based on the focus error signal that has passed through the filter 43, outputs a focus drive signal to drive a focus actuator 2a of the optical pickup 2.

The servo control part 4 has, as a feature of this embodiment, FE (focus error) signal amplitude level measurement means 45 for measuring the amplitude level of a focus error signal for performing focus search during a first processing time when the optical pickup 2 irradiates the CD with a laser beam specific to a CD and determines whether or not the optical disc is a CD; and FE (focus error) signal amplitude level adjustment means 46 which, in order to bring the measured amplitude level of the focus error signal to a target value, sets initial values of gains of focus servo drive amplifiers that amplify respective detection signals of four divided detection regions of an optical detector 2b and adjusts the amplitude level of the focus error signal.

The servo control part 4 is also provided with detection signal amplitude level measurement means 47 which measures the amplitude levels of the detection signals from the respective detection regions during a second processing time between the first processing time and a third processing time to be described later. Further, the servo control part 4 is provided with crosstalk cancellation adjustment means 48 which, based on the amplitude levels of the respective detection signals measured by the detection signal amplitude level measurement means 47, cancels crosstalk. More specifically, a gain difference is calculated from the amplitude levels of the detection signals of those, from among the four divided detection regions, which are diagonal to each other. Then, the gain of the focus servo drive amplifier that outputs the detection signal with a larger amplitude level is reduced by the gain difference, or the gain of the focus servo drive amplifier that outputs the detection signal with a smaller amplitude level is increased by the gain difference.

Further, the servo control part 4 is provided with: FE (focus error) signal amplitude level measurement means 49 which measures the amplitude level of the focus error signal during the third processing time when, upon determination in the first processing time that the optical disc is a CD, the optical pickup 2 irradiates the CD with a laser beam specific to a CD and performs focus search; S-curve balance adjustment means 50 which, based on the amplitude level of the focus error signal measured by this FE signal amplitude level measurement means 49, performs S-curve balance adjustment of the focus error signal; and a focus-on means 51 which turns on focus servo control after the S-curve balance adjustment means 50 performs the S-curve balance adjustment of the focus error signal.

Figure 3:
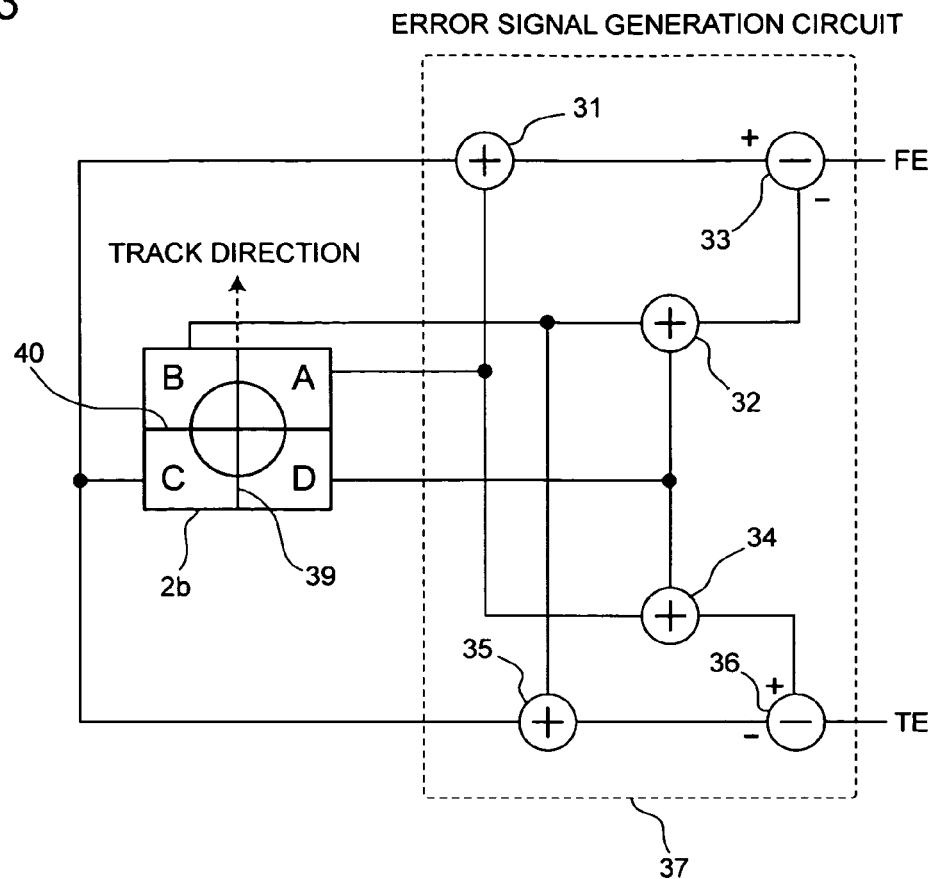
FIG. 3 is a schematic diagram of detection regions of an optical pickup and an error signal generation circuit included in an RF amplifier in the present embodiment.

FIG. 3 is a schematic diagram of the detection regions of the optical pickup and an error signal generation circuit included in the RF amplifier in the embodiment. As shown in FIG. 3, the optical detector 2b of the optical pickup 2 has four detection regions A, B, C, and D divided by a tracking direction axis 39 and an axis 40 orthogonal thereto. The error signal generation circuit 37 is composed of four adders 31, 32, 34, and 35 and two subtracters 33 and 36.

Of the four detection regions A, B, C, and D, the adder 31 adds together outputs of the detection regions A and C, while the adder 32 adds together outputs of the detection regions B and D. The subtracter 33 subtracts the output of the adder 32 from the output of the adder 31, and outputs the subtraction result as the focus error signal FE.

Of the four detection regions A, B, C, and D, the adder 34 adds together outputs of the detection regions A and D, while the adder 35 adds together outputs of the detection regions B and C. The subtracter 36 subtracts the output of the adder 35 from the output of the adder 34, and outputs the subtraction result as a trucking error signal TE in a push-pull system.

Figure 4:
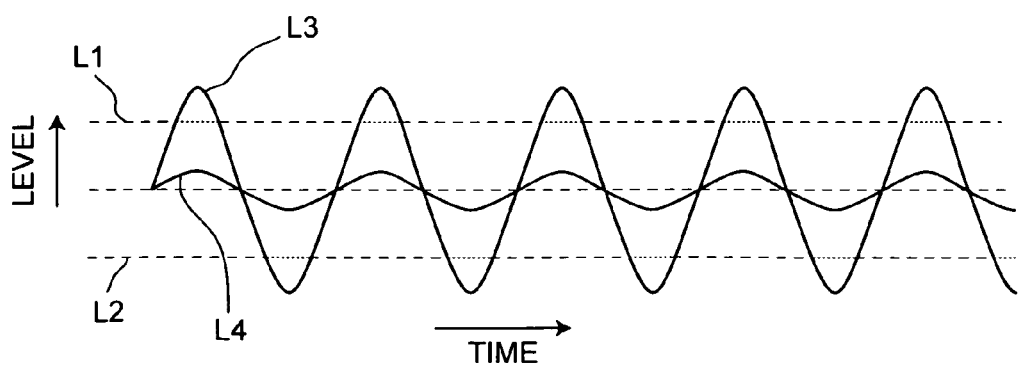
FIG. 4 is a signal waveform diagram for explaining the state in which a crosstalk signal is superimposed on a focus error signal in the embodiment.

FIG. 4 is a signal waveform diagram for explaining the state in which a crosstalk signal is superimposed on the focus error signal in this embodiment. In FIG. 4, lines L1 and L2 show threshold levels of the crosstalk signal which may cause defocusing during seek. A line L3 shows the focus error signal when the crosstalk signal is superimposed thereon. A line 4 shows a normal focus error signal when the crosstalk signal is not superimposed thereon. As shown by the line L3, an increase in the amplitude of the focus error signal results in a seek failure of the optical pickup 2 or a vibration phenomenon.

The crosstalk phenomenon is explained by formulae: TE=(a+d)−(b+c)=(a−b)+(d−c) and FE=(a+c)−(b+d)=(a−b)−(d−c), where the trucking error signal is TE, the focus error signal is FE, the detection signal as the output signal of the detection region A is a, the detection signal as the output signal of the detection region B is b, the detection signal as the output signal of the detection region C is c, and the detection signal as the output signal of the detection region D is d. According to these formulae, the components of TE, (a−b) and (d−c), are also present in FE; thus, the components of the trucking error signal affect the focus error signal, thus causing a crosstalk phenomenon.

Figure 5:
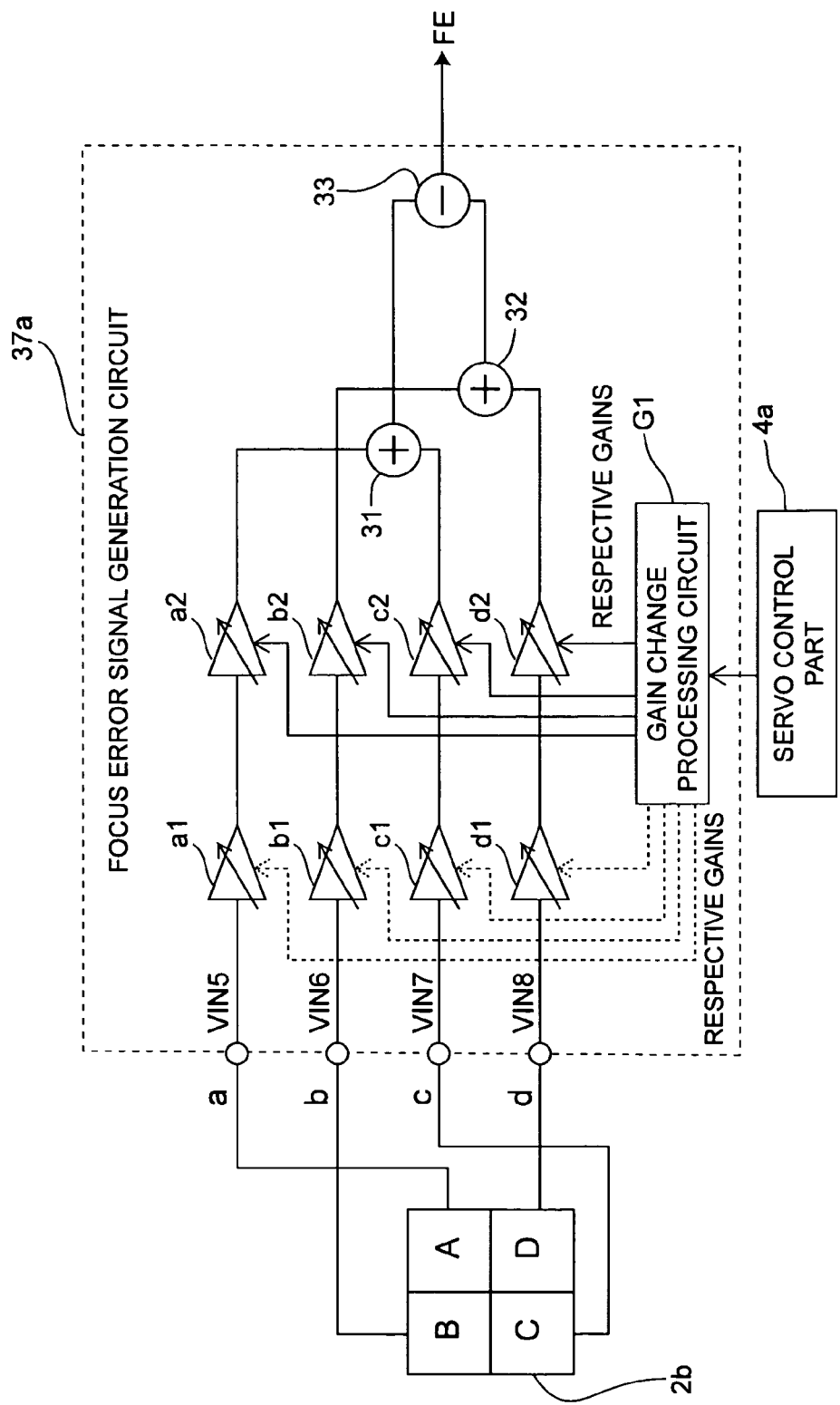
FIG. 5 is a block diagram of a focus error signal generation circuit included in the RF amplifier in the embodiment.

FIG. 5 is a block diagram of a focus error signal generation circuit included in the RF amplifier in this embodiment. In FIG. 5, the focus error signal generation circuit 37a shows in detail a portion of the error signal generation circuit 37 shown in FIG. 3 which portion is related to the focus error. In FIG. 5, those corresponding to the components shown in FIG. 3 are provided with the same numerals.

In FIG. 5, the focus error signal generation circuit 37a is included inside the IC (integrated circuit) composing the RF amplifier 6 (see FIG. 2). VIN5 is an input terminal for inputting the detection signal a as the output signal of the detection region A of the optical detector 2b, and VIN6 is an input terminal for inputting the detection signal b. VIN7 is an input terminal for inputting the detection signal c, and VIN8 is an input terminal for inputting the detection signal d.

The detection signal a inputted to the VIN5 is amplified by two-stage focus servo drive amplifiers a1 and a2 and inputted to the adder 31. The detection signal b inputted to the VIN6 is amplified by two-stage focus servo drive amplifiers b1 and b2 and inputted to the adder 32. The detection signal c inputted to the VIN7 is amplified by two-stage focus servo drive amplifier c1 and c2 and inputted to the adder 31. The detection signal d inputted to the VIN8 is amplified by two-stage focus servo drive amplifiers d1 and d2 and inputted to the adder 32. The focus servo drive amplifiers a1 to d2 have gains thereof individually adjusted by a gain change processing circuit G1 controlled by the servo control part 4.

The adder 31 adds together an output signal of the focus servo drive amplifier a2 and an output signal of the focus servo drive amplifier c2. The adder 32 adds together an output signal of the focus servo drive amplifier b2 and an output signal of the focus servo drive amplifier d2. The subtracter 33 subtracts an output signal of the adder 32 from an output signal of the adder 31, and outputs this subtraction result as the focus error signal FE.

Figure 6:
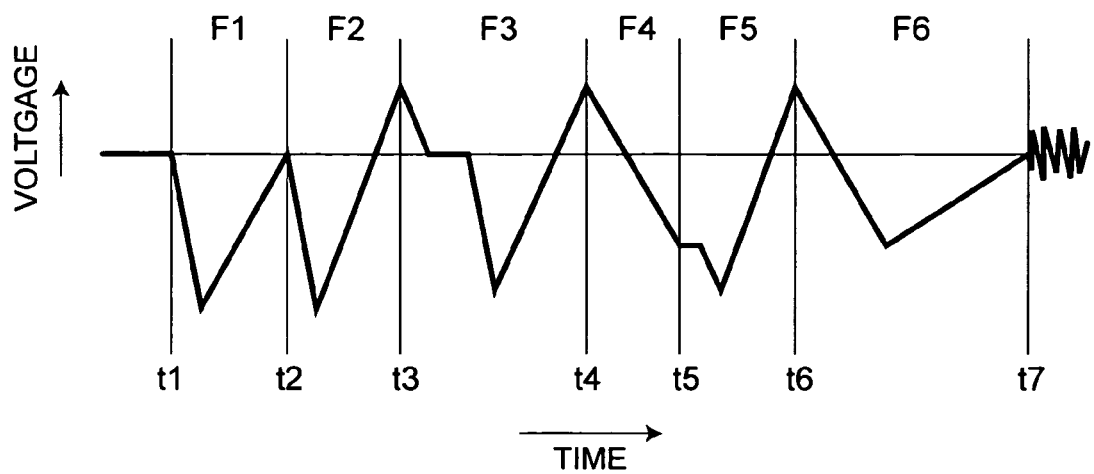
FIG. 6 is a signal waveform diagram showing change in the voltage of a focus drive signal outputted at focus search from the servo control part in the embodiment.

FIG. 6 is a signal waveform diagram showing change in the voltage of a focus drive signal outputted at focus search from the servo control part 4 in this embodiment. In FIG. 6, in the processing time FI from a time point t1 to a time point t2, the optical pickup 2 irradiates the optical disc with a laser specific to a DVD to perform focus search and disc detection (detection whether or not the optical disc inserted in the apparatus is a DVD). In a processing time F2 from the time point t2 to a time point t3, similarly, the optical pickup 2 irradiates the optical disc with a laser specific to a DVD to perform focus search and disc detection (detection whether or not the optical disc inserted in the apparatus is a DVD). Due to the presence of a DVD with a hybrid layer including both a DVD layer and a CD layer, whether or not the inserted optical disc is a DVD is detected during the processing time F1 and the processing time F2 for distinction between an ordinary DVD and a DVD with a hybrid layer.

At a processing time (first processing time) F3 from the time point t3 to a time point t4, the optical pickup 2 irradiates the CD with a laser beam specific to a CD to perform focus search and disc detection (detection whether or not the optical disc inserted in the apparatus is a CD). At a processing time (third processing time) F5 from a time point t5 to a time point t6, as a result of the disc detection at the processing times F1, F2, and F3, if the inserted optical disc is a DVD, the optical pickup 2 irradiates the DVD with a laser beam specific to a DVD to perform focus search. On the other hand, if the inserted optical disc is a CD, the optical pickup 2 irradiates the CD with a laser beam specific to a CD to perform focus search.

A processing time (second processing time) F4 from the time point t4 to the time point t5 has not been used in conventional processing. However, in this embodiment, the amplitude levels of the detection signals a, b, c, and d as the output signals of the detection regions A, B, C, and D are individually measured to adjust the gains of the focus servo drive amplifiers a2, b2, c2, and d2 individually. Here, the gains of the focus servo drive amplifiers a1, b1, c1, and d1 are provided in common while the gains of a2, b2, c2, and d2 are adjusted individually. Conversely, the gains of the focus servo drive amplifiers a2, b2, c2, and d2 may be provided in common while the gains of the focus servo drive amplifiers a1, b1, c1, and d1 may be adjusted individually. Further, each gain of all the focus servo drive amplifiers a1 to d2 may be adjusted individually.

At processing time F6 from a time point t6 to a time point t7, the system controller 22, referring to the amplitude level of the focus error signal measured by the focus search at the processing time F5, issues a focus-on command, and turns on focus servo of the servo control part 4 at the time point t7.

Figure 7:
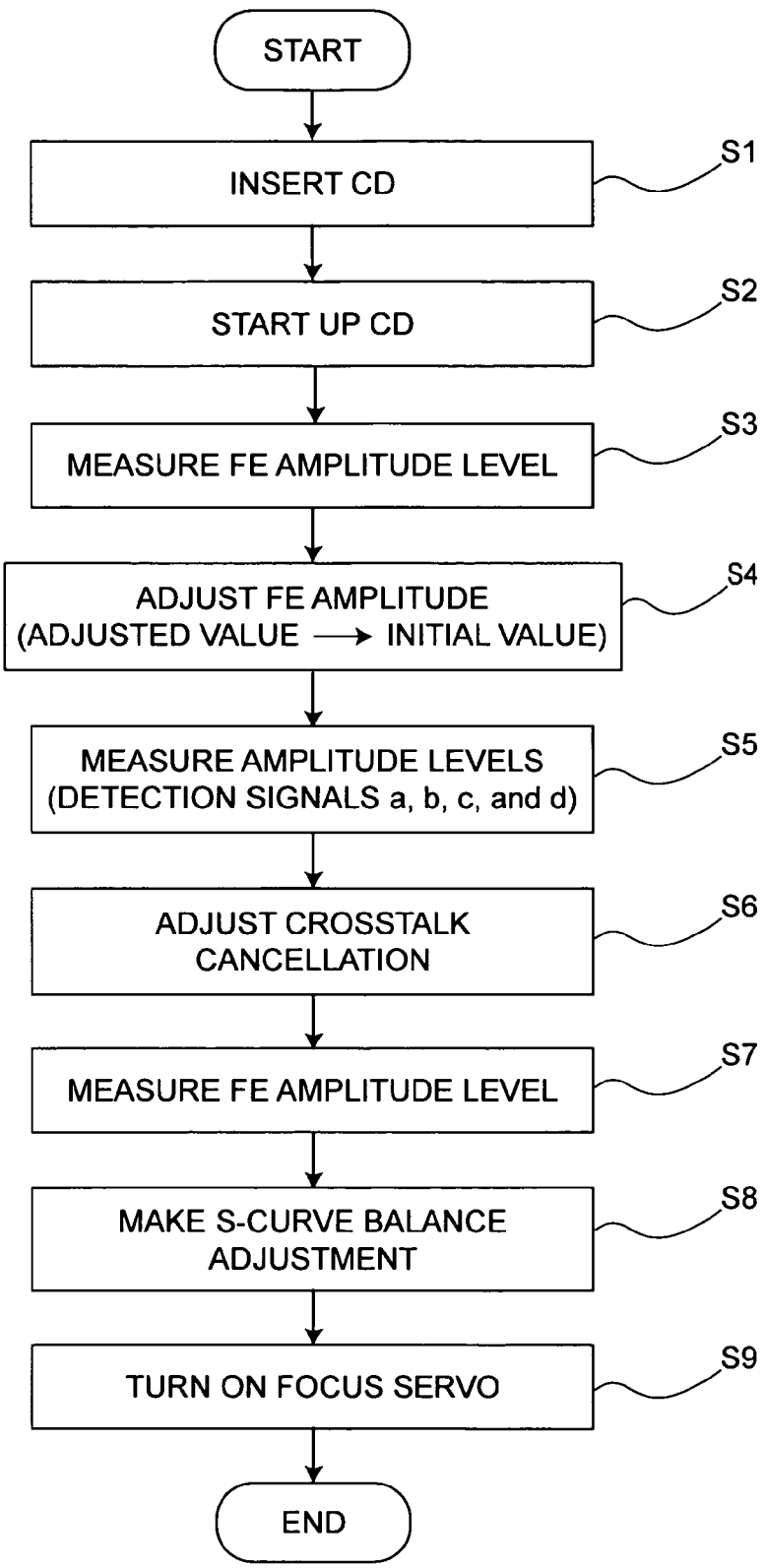
FIG. 7 is a flowchart for explaining the process from when a CD is inserted to when focus servo is turned on in the embodiment.
Figure 8:
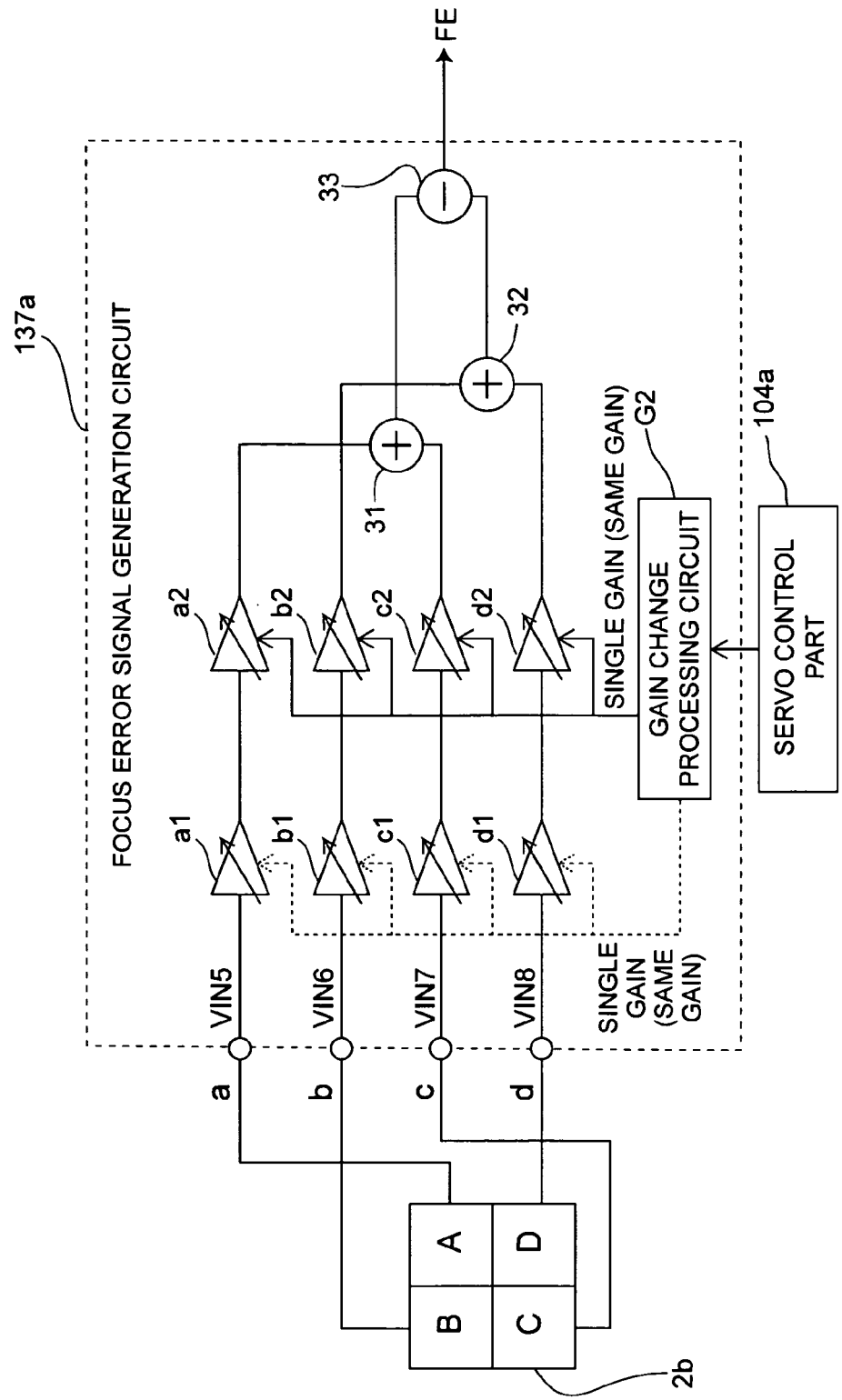
FIG. 8 is a block diagram of a focus error signal generation circuit included in an RF amplifier in a conventional optical disc apparatus.

FIG. 7 is a flowchart for explaining process from when the CD is inserted to when focus servo is turned on in this embodiment. Referring to this flowchart and FIGS. 1 to 6, the process from when the CD is inserted to when focus servo is turned on will be described.

This optical disc apparatus is inserted in the CD (step S1), whereby the CD starts up (step S2). Specifically, after the CD is inserted in the optical disc apparatus, the CD rotates, recording information is read from the CD by the optical pickup 2, and an RF signal is outputted from the optical detector 2b (see FIG. 2) of the optical pickup 2. This RF signal is amplified by the RF amplifier 6, and inputted to the servo control part 4.

In the servo control part 4, an trucking error signal included in the inputted RF signal is detected by a trucking error signal detection circuit (not shown). Next, this trucking error signal is inputted to a tracking drive circuit (not shown) to thereby generate a tracking drive signal, which is then supplied to a tracking actuator of the optical pickup 2 (not shown). Next, the tracking actuator is driven to perform tracking servo control. The focus error signal included in the inputted RF signal is detected by the focus error signal detection circuit 41 (see FIG. 2). This focus error signal is inputted to the focus drive circuit 44 via the amplifier 42 and the filter 43 to thereby generate a focus drive signal, which is then supplied to the focus actuator 2a (see FIG. 2) of the optical pickup 2, and then the focus actuator 2a is driven to perform focus servo control.

Before such focus servo control is performed, after the CD starts up (step S2), the FE signal amplitude level measurement means 45 of the servo control part 4 measures the amplitude level of the focus error signal for performing focus search at the processing time F3 (step S3). In order to bring the measured amplitude level of the focus error signal to a target value, for example, the FE signal amplitude level adjustment means 46 sets the gains of the focus servo drive amplifiers a2, b2, c2, and d2 as initial values (common value) and adjusts the amplitude level of the focus error signal (step 4). Here, assuming that the gains of the focus servo drive amplifiers a1 to d1 at the first stage are previously fixed at the same value, and the initial values of the gains of the focus servo drive amplifier a2 to d2 at the second stage are set, although the actual conditions may be reversed, or the initial values of the gains of the focus servo drive amplifiers a1 to d2 at the first stage and the second stage may be set.

Next, at the processing time F4, the detection signal amplitude level measurement means 47 measures the amplitude level of the detection signals a, b, c, and d (step S5). More specifically, the detection signal amplitude level measurement means 47 measures maximum and minimum values of each of the detection signals a, b, c, and d, and calculates the respective amplitude levels (p-p level) based on the measurement values. Then, the crosstalk cancellation adjustment means 48, based on the amplitude levels of the detection signals of those, from among the detection regions A, B, C, and D, which are orthogonal to each other, calculates a difference in the gain between the focus servo drive amplifiers amplifying these detection signals so that that crosstalk can be cancelled based on the amplitude levels of the respective detection signals a, b, c, and d measured by the detection signal amplitude level measurement means 47. Next, adjustment is made so that the gain of the focus servo drive amplifier outputting the detection signal with a larger amplitude level is reduced by the gain difference, or the gain of the focus servo drive amplifier outputting the detection signal with a smaller amplitude level is increased by the gain difference (step S6).

For example, if the detection signal a is twice the detection signal c, the gain of the focus servo drive amplifier a2 is set at half the gain of the focus servo drive amplifier c2 so that the detection signal a amplified by the focus servo drive amplifiers a1 and a2 and the detection signal c amplified by the focus servo drive amplifiers c1 and c2 become equal to each other. If the detection signal a is half the detection signal c, the gain of the focus servo drive amplifier a2 is set at twice the gain of the focus servo drive amplifier c2 so that the detection signal a amplified by the focus servo drive amplifiers a1 and a2 and the detection signal c amplified by the focus servo drive amplifiers c1 and c2 become equal to each other. In this case, the gain of the focus servo drive amplifier is increased when the level of the detection signal as an output signal of the focus servo drive amplifier is lower than the original level. Contrarily, the gain of the focus servo drive amplifier is reduced when the level of the detection signal as an output signal of the focus servo drive amplifier is higher than the original level.

If it is judged at the processing time F3 that the optical disc inserted in the apparatus is a CD, an FE signal amplitude level measurement means 49 measures the amplitude level of the focus error signal during the processing time F5 when the optical pickup 2 irradiates the CD with a laser beam specific to a CD to perform focus search (step S7). The S-curve balance adjustment means 50, based on the amplitude level of the focus error signal measured by the FE signal amplitude level measurement means 49, makes S-curve balance adjustment of the focus error signal (step S8). Then, the focus-on means 51 turns on focus servo control (step S9).

As described above, according to this embodiment, the gains of the focus servo drive amplifiers for the respective detection signals from the respective detection regions are individually adjusted; thus, even in the event of positional balance shift of the detection regions, the levels of the detection signals outputted from the respective focus servo drive amplifiers become equal to each other, thereby reducing the crosstalk. As a result, a seek failure on the optical disc of the optical pickup or a vibration phenomenon in the optical pickup is suppressed, thus preventing defocusing during seek.

What is claimed is:

1. An optical disc apparatus for performing information recording or reproduction on or from an optical disc, the optical disc apparatus comprising: an optical pickup having an optical detector which receives a reflecting beam, by four divided detection regions, from the optical disc which is irradiated with a laser beam; a focus error signal generation circuit which generates a focus error signal based on detection signals from the four divided detection regions; and a servo control part which performs tracking servo and focus servo of the optical pickup on the optical disc, wherein the focus error signal generation circuit comprises focus servo drive amplifiers that amplify the detection signals individually, and wherein the servo control part measures an amplitude level of the focus error signal for performing focus search, sets gains of the focus servo drive amplifiers as initial values based on a result of the measurement so as to bring the amplitude level of the focus error signal to a target value, and measures amplitude levels of the respective detection signals and controls the gains of the focus servo drive amplifies individually so that crosstalk can be cancelled based on the measured amplitude levels of the respective detection signals.

2. The optical disc apparatus according to claim 1, wherein the focus servo drive amplifiers are grouped into former-stage amplifiers and latter-stage amplifiers, wherein, when the gains of the former-stage amplifiers are fixed, the gains of the latter-stage amplifiers are individually controlled so that the crosstalk can be cancelled, and wherein, when the gains of the latter-stage amplifiers are fixed, the gains of the former-stage amplifiers are individually controlled so that the crosstalk can be cancelled.

3. An optical disc apparatus for performing information recording or reproduction on or from an optical disc, the optical disc apparatus comprising: an optical pickup having an optical detector which receives a reflecting beam, by four divided detection regions, from the optical disc which is irradiated with a laser beam; a focus error signal generation circuit which generates a focus error signal based on detection signals from the four divided detection regions; and a servo control part which performs tracking servo and focus servo of the optical pickup on the optical disc, wherein the focus error signal generation circuit comprises focus servo drive amplifiers that amplify the detection signals individually, and wherein the servo control part comprises:

first focus error signal amplitude level measurement means which measures an amplitude level of the focus error signal for performing focus search at a first processing time for the optical pickup to irradiate a CD with a laser beam specific to a CD and then for determining whether or not the optical disc is a CD;

focus error signal amplitude level adjustment means which sets gains of the focus servo drive amplifiers as initial values and adjusts the amplitude level of the focus error signal at the first processing time so at to bring the measured amplitude level of the focus error signal to a target value;

detection signal amplitude level measurement means which measures amplitude levels of the detection signals from the respective detection regions at a second processing time following the first processing time;

crosstalk cancellation adjustment means which controls the gains of the focus servo drive amplifiers individually at the second processing time so that crosstalk can be cancelled based on the amplitude levels of the respective detection signals measured by the detection signal amplitude level measurement means;

second focus error signal amplitude level measurement means which measures the amplitude level of the focus error signal at a third processing time when the optical pickup irradiates the CD with the laser beam specific to a CD to perform focus search, in a case where it is judged at the first processing time that the optical disc is a CD;

S-curve balance adjustment means which performs S-curve balance adjustment of the focus error signal at the third processing time based on the amplitude level of the focus error signal measured by the second focus error signal amplitude level measurement means; and focus-on means that turns on control of the focus servo at the third processing time after the S-curve balance adjustment is performed.

4. The optical disc apparatus according to claim 3, wherein the crosstalk cancellation adjustment means calculates, a gain difference from the amplitude levels of the detection signals from the detection regions, from among the four divided detection regions, which are orthogonal to each other; and the gain of the focus servo drive amplifier which amplifies the detection signal with a larger amplitude level is reduced by the gain difference, or the gain of the focus servo drive amplifier which amplifies the detection signal with a smaller amplitude level is increased by the gain difference.

5. The optical disc apparatus according to claim 3, wherein the focus servo drive amplifiers are grouped into former-stage amplifiers and latter-stage amplifiers, wherein, when the gains of the former-stage amplifiers are fixed, the gains of the latter-stage amplifiers are individually controlled so that the crosstalk can be cancelled, and wherein, when the gains of the latter-stage amplifiers are fixed, the gains of the former-stage amplifiers are individually controlled so that the crosstalk can be cancelled.

6. A control method for an optical disc apparatus which performs information recording or reproduction on or from an optical disc and which includes: an optical pickup having an optical detector which receives a reflecting beam, by four divided detection regions, from the optical disc which is irradiated with a laser beam; a focus error signal generation circuit which generates a focus error signal based on detection signals from the four divided detection regions; and a servo control part which performs tracking servo and focus servo of the optical pickup on the optical disc, the control method comprising the steps of:

measuring an amplitude level of the focus error signal for performing focus search;

adjusting the amplitude level of the focus error signal by setting initial values of gains for amplifying the respective detection signals from the respective four divided detection regions of the optical detector so as to bring the measured amplitude level of the focus error signal to a target value;

measuring the amplitude levels of the detection signals from the respective detection regions; and amplifying the detection signals by the respective individual gains so that crosstalk can be cancelled based on the measured amplitude levels.

7. The control method for an optical disc apparatus according to claim 6, wherein, in the step of amplifying the detection signals by the respective individual gains, a gain difference is calculated from the amplitude levels of the detection signals from the detection regions, from among the four divided detection regions, which are orthogonal to each other; and the gain for amplifying the detection signal with a larger amplitude level is reduced by the gain difference, or the gain for amplifying the detection signal with a smaller amplitude level is increased by the gain difference.

* * * * *